Fig. 4

United States Patent Office 3,559,295
Patented Feb. 2, 1971

3,559,295
DEVICE FOR MEASURING INCLINATION
Yasuo Iwafune, Tokyo, Japan, assignor to Tokyo Optical Company Limited, Tokyo, Japan
Filed June 26, 1967, Ser. No. 648,924
Claims priority, application Japan, July 12, 1966,
41/45,552
Int. Cl. G01c 7/00, 9/04
U.S. Cl. 33—206                                            2 Claims

ABSTRACT OF THE DISCLOSURE

A device for measuring inclination for use in measuring the inclination along straight portions of a machine such as a bed surface thereof, comprising a detector means including an instrument having two connected points, an indicator means including a recording pen in contact with a record sheet, a clutch means. The device is a programming means, and constructed and arranged such that the values measured by the two connected points can automatically be integrated and recorded in succession on the record sheet thus showing the deviation from the horizontal thereon.

---

The present invention relates to a device for measuring inclination or deviation from the horizontal or vertical for use in measuring inclination along straight-line portions of a machine such as a bed surface thereof.

At present the deviation from the horizontal of the bed surface etc. of a machine is measured by the following three methods. That is, (1) a first method in which use is made of a piano wire under tension or an optical axis of an alignment telescope;
(2) a second method of using a straight edge or a standard surface plate and a dial gauge; and
(3) a third method of utilizing two connected points wherein use is made of an instrument accurately measuring angles such as a level vial or an autocollimator.

The above first and second methods render it possible to continuously measure inclination, but have the disadvantage that the inclination can not be measured in a highly accurate manner where the surface to be measured is of relatively large dimesions. Thus, in practice the above third method utilizing the two connected points has advantageously been adopted. This third method makes it possible to obtain an accuracy depending upon a highly accurate measuring instrument used, but has disadvantages that it is necessary to make integral calculations and the values obtained must be plotted into a graph, thus rendering the measuring operation very troublesome and, consequently, greatly increasing the chances of error. In order to obviate such disadvantages it has been proposed to automatically store the erroneous values in succession by means of an integrating condenser. This method has the further disadvantage that the electric charge is liable to be discharged unless the measurement is completed within a predetermined short duration.

The principal object of the invention is to provide a device for measuring inclination with the aid of two connected points without the above disadvantages.

A feature of the invention is the provision of such an improved device for measuring inclination, comprising a detector means including a transducer for determining the inclination between two connected points and a servomotor connected to the output of the detector means for delivering an angular displacement proportional to the deviation from the horizontal measured, an indicator means including a recording pen in contact with a record sheet and movable along the record sheet in accordance with the angular displacement delivered from said servomotor and recording the angular displacement on the record sheet, a clutch means including an electromagnetic clutch and connecting and disconnecting between said detector means and said indicator means so as to transmit or not transmit the angular displacement delivered from said detector means to said indicator means, and a programming means delivering instructions operating said detector means.

Other objects, feature and advantages of the invention will become apparent from a consideration from the following specification, when the specification is considered in conjunction with the accompanying drawing wherein FIG. 1 is a diagrammatic view illustrating a conventional method of measuring the inclination or deviation from the horizontal of a bed surface of a machine by means of two connected points wherein the deviation from the horizontal of the bed surface of the machine is measured by displacing a level vial along thereon;

FIG. 4 is a perspective view showing an embodiment of a device constructed on the basis of the principle according to the invention shown in FIG. 3;

Figure 1:
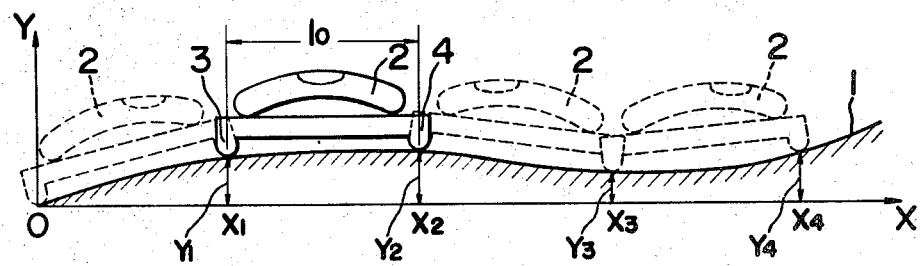

Referring to FIG. 1 illustrating the principle of a conventional method of measuring deviation from the horizontal by means of two connected points and showing a longitudinal section of a machine bed surface on $x$ axis parallel to the horizontal level and $y$ axis perpendicular to the $x$ axis, 1 designates the bed surface whose inclination is to be measured, 2 a level vial, 3 and 4 two connected points, that is, two legs of the level vial 2, and $lo$ the distance between the legs 3 and 4 of the level vial 2.

Figure 2:
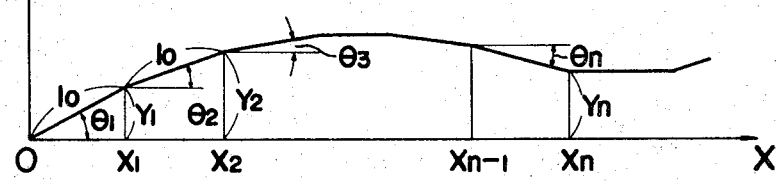
FIG. 2 shows a graph showing the deviation from the horizontal plotted on the basis of the values measured by means of the method shown in FIG. 1.

In FIG. 1 it will be understood that the "waviness" of the bed surface 1 is sufficiently large relatively to $lo$ and the surface roughness may be disregarded. In order to obtain the deviation from the horizontal along the $x$ axis, the legs 3 and 4 of the level vial 2 are placed on the desired starting points of the bed surface 1, that is, on $0-x$, as shown by dotted lines to obtain the reading of the level vial 2 corresponding to $(y_1-0)/lo \cong \theta_1$, for small angle approximations. Then, the legs 3 and 4 are placed on the position $x_1-x_2$ as shown by full line to obtain the reading of the level vial 2 corresponding to $(y_2-y_1)/lo \cong \theta_2$. Subsequently, the two connected points of the level vial 2 are displaced along a desired length of the axis towards successive positions as shown by dotted lines to obtain the readings $\theta_t$ of the level vial 2 at each of these positions. After the measurement has been completed, the readings $\theta_t$ are added algebraically in succession to obtain $$\sum_{t=1}^{t=n} \theta_t$$

corresponding to the algebraic sum of $\theta_1, \theta_2, \theta_3 \ldots \theta_n$, that is, $\theta_1+\theta_2+\theta_3 \ldots +\theta_n$, such that $y_n = l_0(\theta_1+\theta_2+\theta_3 \ldots +\theta_n)$ is a measure of the deviation from the horizontal at the point $X_n$. FIG. 2 shows the readings of $\theta_1, \theta_2 \ldots \theta_n$ and the deviations from the horizontal $y_1, y_2 \ldots y_n = lo\theta_1, lo(\theta_1+\theta_2) \ldots lo(\theta_1+\theta_2+ \ldots \theta_n)$ obtained as above described and plotted onto a section paper with respect to the $x$ axis. The above described conventional method of measuring the inclination of the bed surface by means of the two connected points has the disadvantages that it requires an integral calculation and plotting of the results thereof into a graph after the measurement has been completed thus rendering the measuring operation complicated and the calculation subject to error.

Now, the principle of the invention aimed at to obviate such disadvantages of the conventional method utilizing the two connected points will be explained with reference to FIG. 3. In accordance with an important feature of the invention the results of the measurement of the inclination between a series of points taken two at a time are automatically recorded in graphical form so that the various steps described hereinabove, i.e., mental calculations and physical plotting of the results of the calculations, are eliminated.

Figure 3:
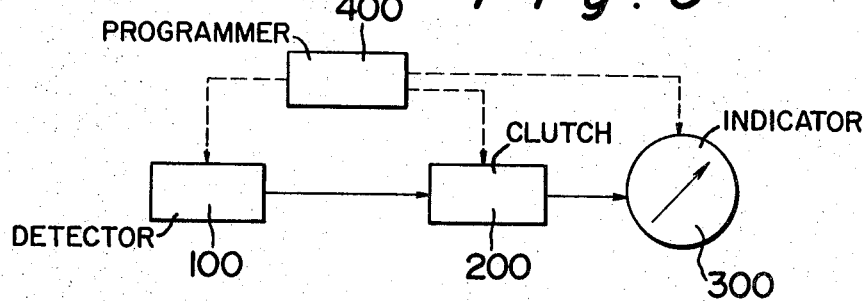
FIG. 3 is a block diagram illustrating the principle according to the invention.

A device according to the invention shown in FIG. 3 comprises a detector means 100, a clutch means 200, an indicator means 300, and a programming means 400.

The angular displacement delivered from the detector means 100 is transmitted through the clutch means 200 to the indicator means 300 as shown by full line arrows in FIG. 3, while instructions delivered from the programming means 400 is transmitted to the detector means 100, the clutch means 200 and the indicator means 300, respectively, as shown by dotted line arrows.

The detector means 100 includes an instrument having two connected points and electrically measuring the inclination or deviation from the horizontal to be measured, for example, an electric autocollimator or a pendulum type electric level and also includes a servomotor adapted to deliver an angular displacement proportional to the inclination measured.

The indicator means 300 includes a recording pen in contact with a record sheet and movable along the record sheet in accordance with the angular displacement delivered from detector means 100 so as to record the angular displacement on the record sheet.

The clutch means 200 includes an electromagnetic clutch and is adapted to connect or disconnect between the detector means 100 and the indicator means 300 so as to transmit or not transmit the angular displacement delivered from the detector means 100 to the indicator means 300.

The programming means 400 is constructed so that instructions are delivered to the detector means 100, the clutch means 200 and the indicator means 300, respectively, so as to effect the sequence of operations of these means necessary to provide a record of the measurements obtained on the record sheet. The sequence of these operations is as follows. First, when a starting push button is pushed down a self-holding circuit supplying a timing motor is closed. Then, the clutch means 200 is operated so as to effect engagement between the detector means 100 and the indicator means 300. Subsequently, the indicator means 300 is operated to record the deviation from the horizontal on the record sheet. Then, the output end of the detector means 100 is short circuited to effect disengagement between the detector means 100 and the indicator means 300. Lastly, the record sheet is fed a given distance.

Figure 4:
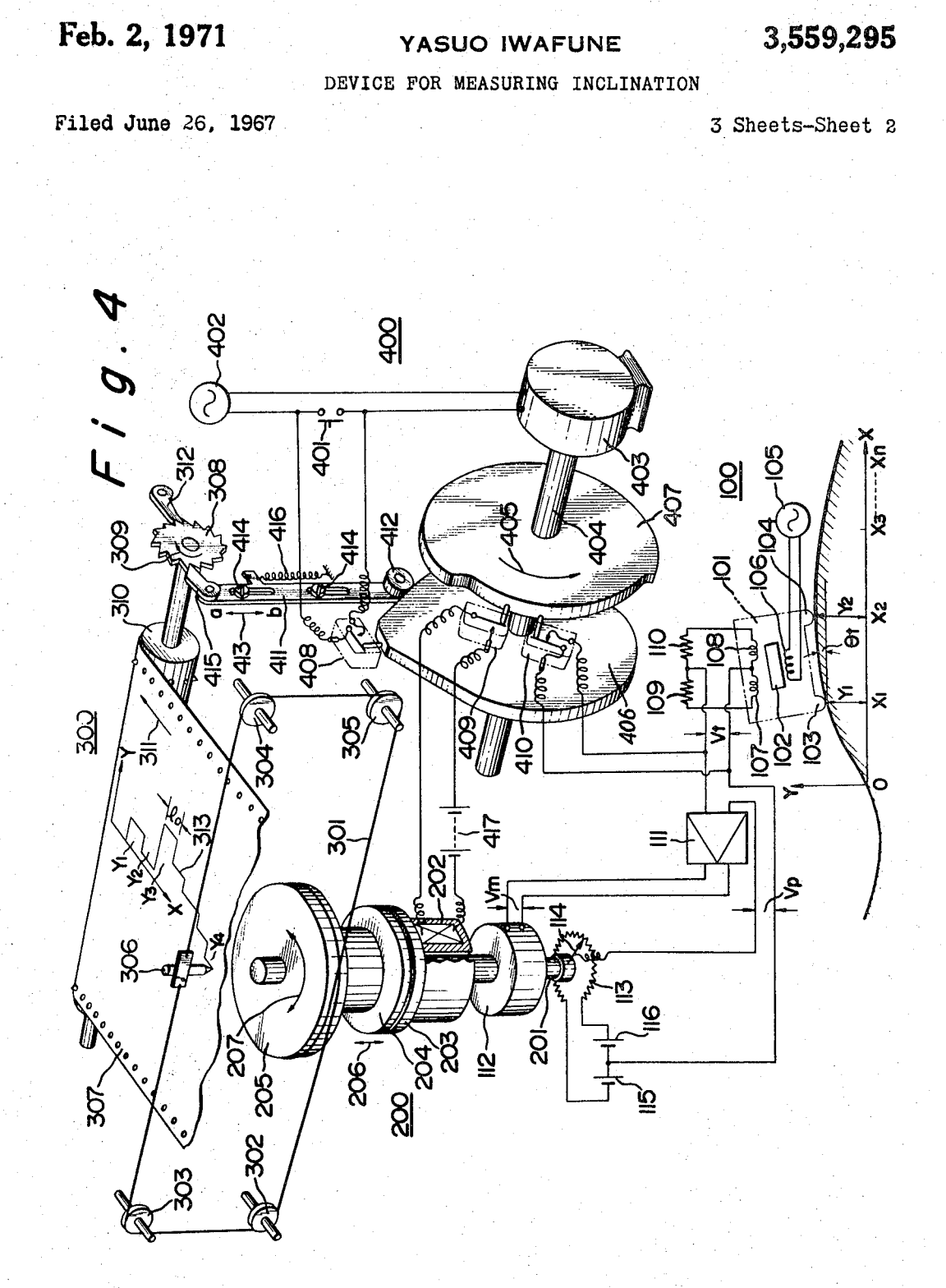

A device embodying the invention will now be explained with reference to FIG. 4.

The detector means 100 includes an electric level 101 having two legs 103 and 104, spaced apart by a distance $lo$ corresponding to the distance $lo$ of FIGS. 1 and 2, and enclosing therein a pendulum 102, an exciting coil 106 connected to an exterior electric supply source 105 and series connected differential coils 107, 108 and also includes resistors 109 and 110 connected in series each other and in parallel with said differential coils 107, 108 to form a bridge, an amplifier 111 connected across the connection between the resistors 109, 110 and the connection between the differential coils 107, 108 so that the output from the bridge is amplified, a servomotor 112 adapted to be operated by the output from the amplifier 111, and a potentiometer including a brush 114 secured to a rotor shaft 201 of the servomotor 112 and slidable along a resistor 113 to divide the voltage of electric supply sources 115 and 116 and apply the voltage thus divided to the amplifier 111. The pendulum 102 in an exemplary embodiment, is supported at both ends by supporting wires (not shown) so that the pendulum 102 will assume an inclined position where the level 101 is located on an inclined surface, as is illustrated in FIG. 4. Because of changes in the inclination of pendulum 102 in accordance with the changes in the inclination of the surface under investigation, there will be corresponding changes in the degree of coupling between the pendulum 102 and coils 107 and 108. For the position of the pendulum 102 illustrated, the pendulum is closely coupled to coil 108 and more remotely coupled to coil 107. With level 101 located on a level surface the position of pendulum 102 would also be level and consequently the coupling between the pendulum 102 and coils 107 and 108 would be the same. Under these circumstances the bridge formed by coils 107 and 108 and resistors 109 and 110 is balanced and the output voltage $V_t$ is zero. On the other hand, for inclined positions of pendulum 102 the coupling between pendulum 102 and coils 107 and 108 is different, as discussed hereinabove, and a non-zero voltage $V_t$ is produced because of the unbalance of the bridge circuit, the voltage $V_t$ being proportional to the deviation from the horizontal of the pendulum 102. The output of the bridge circuit is short circuited by a closed microswitch 410, the short circuit being opened when a cam 407 has rotated a predetermined angle.

Figure 6:
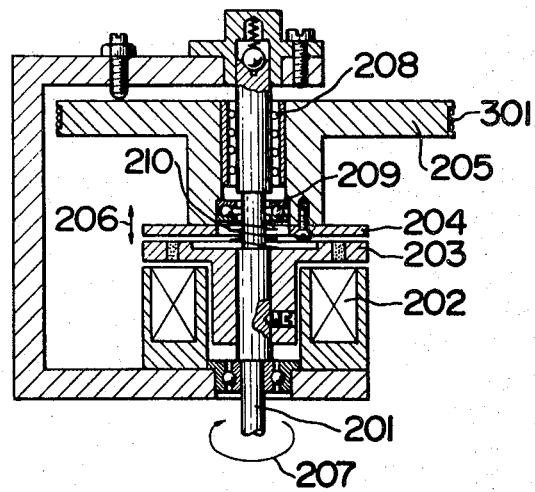
FIG. 6 is an enlarged sectional view of a clutch means included in the embodiment shown in FIG. 4.

The clutch means 200 includes an electromagnetic clutch having a disc 204 and a thread wheel 205 rotatably mounted through a slide bearing 208 around a rotor shaft 201 extending out of the sevromotor 112 as shown in FIG. 6. The disc 204 is secured to the thread wheel 205 and made integral with the latter. The assembly is adapted to be reciprocated in either directions as shown by an arrow 206 relative to a disc 203 secured to the rotor shaft 201 as explained hereinbelow. The disc 203 is provided at its lower side with an exciting coil 202 which when energized from an electric supply source 417 through a microswitch 409 serves to magnetize the disc 203. Disc 203, when magnetized, will attract clutch disc 204 downwardly from the normally spaced apart position thereof so that rotation of shaft 201 is transmitted to thread wheel 205. The disc 204 and the thread wheel 205 are rotatably journalled on a thrust bearing 209 for the purpose of reducing friction due to gravity when the disc 204 and the thread wheel 205 rotate together with the rotor shaft 201.

The thread wheel 205 is wound around its periphery by a thread 301 whose one end is connected through guide wheels 302, 303 to one side of a holder for a recording pen 306 and the other end connected through guide wheels 304, 305 to the other side of the holder for the recording pen 306. The recording pen 306 is made in contact with a record sheet 307 wound around a take up roller 310 and fed in a direction shown by an arrow 311. To the shaft of the take up roller 310 is secured a ratchet wheel 308 adapted to be rotated by a pawl 415 in a direction shown by an arrow 309 thus rotating the roller 310. 312 designates a retaining pawl preventing the ratchet wheel 308 from becoming rotated in a reverse direction.

The programming means 400 comprises a timing motor 403, two cams 406, 407 secured to a rotor shaft 404 of the timing motor 403, microswitches 409, 410 having contacts adapted to be opened or closed by the peripheral edge of the cam 407, a microswitch 408 having a contact adapted to be opened or closed by the peripheral edge of the cam 406, and a lever 411 provided with an elongated slot through which is extended a stationary guide pin 414 and caused to be reciprocally moved in directions $a$ and $b$ shown by an arrow 413. The lever 411 is provided at its free end with a roller 412 pressed against the peripheral edge of the cam 406 by means of a spring 416 and provided at the other end with the driving pawl 415 in mesh with the ratchet wheel 308. The motor 403 is connected through a starting button switch 401 to an electric supply source 402. Across the switch 401 is connected the microswitch 408 as shown in FIG. 4. When the cams 406 and 407 are caused to be rotated in a direction shown by an arrow 405, the microswitches 408 and 409 are closed while the microswitch 410 becomes opened.

The operation of the above described embodiment of the invention will now be explained.

At first the legs 103, 104 of the electric level 101 are placed on a horizontal plane and the indicator means 300 is suitably set such that the recording pen 306 is brought into coincidence with a point 0 on the record sheet 307. Then, the legs 103 and 104 of the electric level 101 are placed on the starting points 0 and $x_1$ (viewed along the x-axis) of the bed surface to be measured (this bed surface being denoted 1 in FIG. 1) as shown by #0 in FIG. 5. The pendulum 102 of the differential transformer of the electric level 101 becomes inclined in either right or left direction to produce unbalanced voltage $V_t$ in the bridge consisting of the differential coils 107, 108 energized from the exciting coil 106 and of the resistors 109, 110. Since $V_t$ is proportional to $lo\theta_t$ the value of $V_t$ in this position is proportional to $lo\theta_1$. The starting button switch 401 is not yet closed so that the input end of the amplifier 111 is shortcircuited by the microswitch 410, which results in $V_t=0$. In accordance with well known servo-mechanism principles the movement of servomotor 112 dictated by the voltage $V_t$ will result in a change in the setting of brush or tap 114 of potentiometer 113 and thus in a D.C. balancing voltage $V_p$ which will balance the D.C. voltage $V_t$. In this way the effect of voltage $V_t$ is counter-balanced when the desired rotation of shaft 201 has been effected. Reference is made to the text, Principles of Servomechanisms, by G. S. Brown et al., at pages 45 to 47 for a description of an elemental remote control positional servomechanism.

Figure 5:
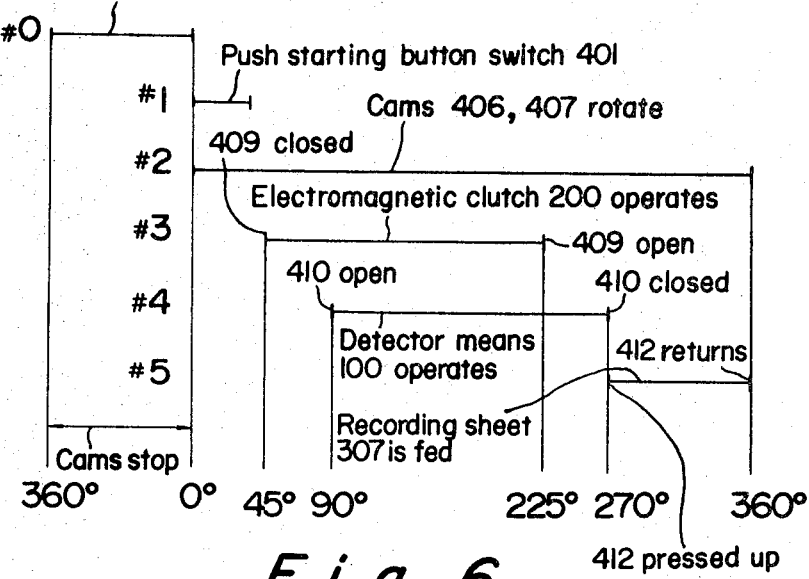
FIG. 5 is a graph illustrating the sequence of operations of the embodiment shown in FIG. 4.

Then, the starting button switch 401 is closed as shown by #1 in FIG. 5. The timing motor 403 is connected to the electric supply source 402 and causes the rotor shaft 404 to rotate in a direction shown by an arrow 405. At the same time, a projection formed on the peripheral edge of the cam 406 passes over the miscroswitch 408 to close the contacts thereof thereby closing a selfholding circuit for the motor 403. Thus the motor 403 causes the cams 406, and 407 to continuously rotate as shown by #2 in FIG. 5. When the cam 407 is rotated about 45° the projection thereof causes the contacts of the microswitch 409 to close thus connecting the coil 202 of the electromagnetic clutch of the clutch means 200 to an electric supply source 417 and hence magnetizing the disc 203 of the electromagnetic clutch. Thus the disc 204 is caused to be attracted downwards by the magnetized disc 203 as shown by #3 in FIG. 5. When the cam 407 rotates about 90° the projection thereof causes the contacts of the microswitch 410 to open thus opening the shortcircuit of the output end of the electric level 101. The voltage $V_t$ is thus applied through the amplifier 111 to the servomotor 112 as shown by #4 in FIG. 5. Thus, the servomotor 112 starts to rotate and causes the brush 114 of the potentiometer to slide along the resistor 113 to vary the voltage of the electric supply source 115, 116 into an output voltage $V_p$. The servomotor 112 ceases to rotate at a time when $V_p$ becomes equal to $V_t$ and the input voltage $V_m$ to the servomotor 112 becomes zero. During the rotation the servomotor 112 causes the thread wheel 205 to rotate by an amount $k_1 lo\theta_t$ (where $k_1$ is a constant) of proportionality or a calibration constant proportional to $V_t=lo\theta_t$ in a direction shown by an arrow 207 thus moving the thread 301 wound around the thread wheel 205 and guided by the guide wheels 302–305. This causes the recording pen 306 secured to the thread 301 to move along the record sheet 307 in $y$ direction perpendicular to the $x$ axis. The recording pen 306 ceases to move at a position $k_1 lo\theta_t$ i.e. at a position $k_2 y_t = k_2 lo\theta_t$ (where $k_2$ is a further constant of proportionality). $k_2 y_t$ in this case is $k_2 y_1$ which is equal to $k_2 lo\theta_1$. It is noted that the symbols $y_1$, $y_2$, are used in the upper portion of FIG. 4 to indicate the quantities described, the proportionality factor being understood. Similar considerations apply to the use of $lo$ in that portion of FIG. 4. It should also be understood that the shape of the recorded curve 313 in FIG. 4 is merely illustrative and does not correspond to that which would be produced for the curvature shown in the lower portion of FIG. 4.

The cams 406, 407 of the programming means 400 continue rotations thereof in the direction shown by the arrow 405. When this rotating angle arrives at 225° the projection of the cam 407 passes over the microswitch 409 to open the contacts thereof thereby deenergizing the coil 202 of the clutch means. Thus the recording pen 306 remains at the position $y_1$ and the disc 204 is disengaged from the disc 203 by means of the biasing action of the spring 210. When the rotating angle of the cam 407 becomes about 270° the projection of the cam 407 passes over the microswitch 410 to close the contacts thereof thereby shortcircuiting the output end of the electric level 101. Thus the output voltage $V_t$ of the detector means 100 becomes zero and the servomotor 112 returns to the angular position corresponding to $V_t=0$. At the same time the projection of the cam 406 causes the roller 412 provided at one end of the lever 411 to push upwards in the direction a shown by the arrow 413 as shown by #5 in FIG. 5. Thus the pawl 415 at the other end of the lever 411 is moved upwards against the biasing force of the spring 416 along the guide pin 414 thus rotating the ratchet wheel 308 of the indicator means 300 for one tooth in a direction shown by the arrow 309 and rotating the roller 310 directly connected to the ratchet wheel 308 in the direction shown by the arrow 311 for a given length $k_3 lo$ (here $k_3$ designates a constant). The motor 403 continues its rotation and the cams 406 and 407 rotate 360° and arrive again at the position shown in FIG. 4 where the projection of the cam 406 passes over the roller 412 at one end of the lever 411. Thus the lever 411 moves downwards in a direction shown by the arrow $b$ by the biasing force of the spring 416. The pawl 415 at the other end of the lever 411 moves backwards for one tooth by the biasing action of the spring 416 while the ratchet wheel 308 being made stationary by means of the retaining pawl 312. At the same time the projection of the cam 406 causes the microswitch 408 to push up which results in interruption of shortcircuit between the timing motor 403 and the electric supply source 402, thereby ceasing rotation of the timing motor 403. As above mentioned the operations of one cycle for measuring $lo\theta_t$ have been completed.

In FIG. 5 showing the above mentioned sequence of operations denoted by #1, #2 . . . #5 the rotating angles of the cams 406 and 407 are plotted on the abscissa and the length of the horizontal lines corresponding to #0–#5, respectively, shows the operational range of the rotating angle of the cams 406 and 407.

Ts explained above the deviation from the horizontal $y_t$ at the starting point of measurement 0 and $x_1$ (the x-coordinates only being used here to designate the various points along the curve) is recorded on the record sheet 307 as $k_2 y_1$, then the electric level 101 is displaced and placed on the next succeeding points $x_1$ and $x_2$. Then the starting button 401 is pressed to close the energizing circuit for the timing motor 403. Thus the device automatically restarts the sequence of operations shown in FIG. 5. After one cycle of operations has been completed the recording pen 306 starts from $k_1(y_1)$ along the direction of $y$ on the record sheet 307 and ceases to move at $k_2 y_2$. In this case the value of $k_2 y_2$ shows $k_2 y_2 = k_2 lo(\theta_1+\theta_2)$. Because, in this case the output voltage $V_t$ of the detector means 100 is $k_2(y_2-y_1)=k_2 lo\theta_2$ corresponding to the angle $\theta_2$ at the position $x_1$ and $x_2$. Thus, the servomotor 112 rotates in proportion to the value of the output voltage $V_t$. The recording pen 306 moves further $k_2 l o \theta_2$ from the existing position $(k_1)y_1=k_2 lo\theta_1$ and arrives at a position $k_2 y_2 = k_2 lo(\theta_1+\theta_2)$ with respect to the abscissa $0-x$ on the record sheet 307.

Similarly, the electric level 101 is displaced along two connected points $x_2-x_3$, $x_3-x_4$ ... $x_{n-1}-x_n$ in succession and at each of these points the starting button switch 401 is closed thus automatically effecting the sequence of operations shown in FIG. 5. When the above mentioned measurement has been completed a desired step-shaped curve 313 showing the deviation from the horizontal can be obtained on the record sheet 307, that is $$k_2 y_n = k_2 lo \sum_{t=1}^{t=n} \theta_t$$

can be obtained. It will be appreciated that curve 313 can be read so as to determine the deviation from the horizontal of the curved bed surface for various points along the $x$-axis. If the constant $k_2$ is selected to be sufficiently large, for example, $10^3$, then $k_2 y = 10^3 \times 10^{-3} = 1$ mm. for $y=10^{-3}$ mm. Thus, it is possible to make scale of $10^{-3}$ mm. with respect to the width 1 mm. for the scale of the $y$ axis of the record sheet 307.

In order to manufacture the above mentioned device having a high accuracy in a less expensive manner it is necessary to obviate the error caused by angular transmission of the rotating force from the disc 203 to the disc 204 and also the error caused by the dip of the thread 301 of the indicator means 300.

FIG. 6 shows an embodiment of the clutch means included in the device according to the invention in enlarged section. The slidable disc 204 and the thread wheel 205 are closely fitted through a slide bearing around the rotor shaft 201 of the servomotor 112. The discs 203 and 204 are constructed so that the disc 204 can be attracted by the disc 203 throughout the peripheral surface thereof. This prevents the disc 204 from becoming freely oscillating in case of the axial displacement of the disc 204 and the thread wheel 205. The disc 204 and the thread wheel 205 are rotatably journalled by the thrust bearing 209 so that they can freely be rotated without heavy friction due to gravity. Between the discs 203 and 204 is inserted a compressive spring 210 which serves to prevent the error caused by the transmission of the rotating angle from the disc 203 to the disc 204 in a direction inclined from the axis of these discs. Such error is produced when the disc 204 is attracted to the disc 203 and also when the discs 203 and 204 are rotated after the disc 204 has been attracted to the disc 203 and further when the disc 204 becomes disengaged from the disc 203 by the biasing force of the spring 210.

Figure 7:
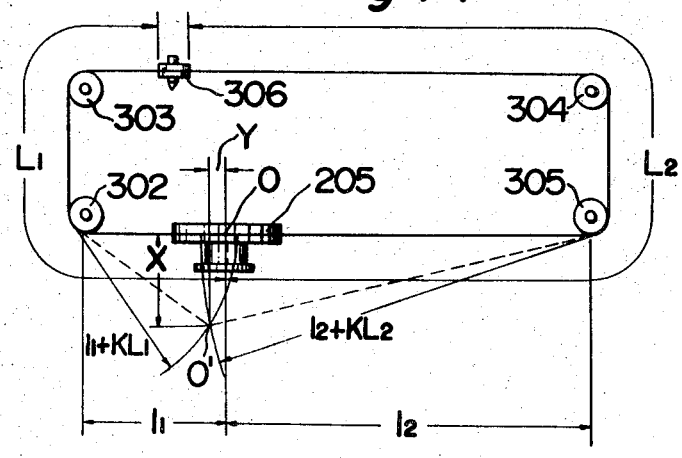
FIG. 7 is a diagrammatic illustration of means for detecting an error caused by displacements of thread and a thread wheel included in the indicator means of the embodiment shown in FIG. 4.

FIG. 7 shows the thread wheel 205 slightly dipped downwards and arrived at a position $z=0.3$ mm. for example, when the disc 204 is attracted by the disc 203. Now, it is assumed that the thread wheel 205 is located at a position 0 when the disc 204 is not attracted by the disc 203, that the lengths of thread from the position 0 to the guide wheels 302 and 305 are $l$ and $l_2$, respectively, and that the lengths of thread from the position 0 to the recording pen 306 are $L_1$ and $L_2$, respectively. It is further assumed that the thread wheel 205 arrives at a new position 0' when the disc 204 is attracted by the disc 203 and hence the thread wheel 205 is pulled downwards. Then, there exists the following formulae:

$$(Y+l_1)^2 + Z^2 = (l_1 + KL_1)^2$$
$$(Y-l_2)^2 + Z^2 = (l_2 + KL_2)^2$$

here the value of Y becomes negative when the position 0' is placed at the left side of the point 0 and becomes positive when the position 0' is placed at the right side of the point 0, and K is elongation percentage under tension.

From the above two formulae Y and Z can be represented as follows.

$$Y = K \frac{l_1 L_1 - l_2 L_2}{l_1 + l_2}$$

$$Z \approx \sqrt{\frac{2K l_1 l_2 (L_1 + L_2)}{l_1 + l_2}}$$

From the above formulae can be calculated Y and Z under such bed condition that $l_1 = 70$ mm.
$l_2 = 200$ mm.
$L_1 = 100$ mm.
$L_2 = 440$ mm.

and $K = 2 \times 10^{-6}$ that is, $-Y = 0.6 \times 10^{-3}$ mm.

and $Z = 0.33$ mm.

In other words, the displacement of the thread wheel 205 can be disregarded.

As explained hereinbefore the device according to the invention provides the important advantages that complex and erroneous calculation and graph plotting operations can be omitted, that the values measured by the two connected points can automatically be integrated and recorded in succession on the record sheet, and that the graphs showing the deviation from the horizontal or vertical of points along the line on the surface to be measured can be recorded in a highly accurate manner. Thus, the invention makes a great contribution to the measurement of the inclination of straight line portions of a machine.

What I claim is:

1. A device for measuring inclination along a line on a slightly curved surface comprising:
two spaced surface contacting elements manually positionable in contact with said surface at successive pairs of substantially equally spaced points along said line, the first point of each successive pair of points being the second point of the preceding pair of points; an electrically actuated detector means, mounted on said contacting elements, including a transducer providing an output signal proportional to the inclination of each of said successive pairs of points; a servomotor connected to the output of the detector means; a clutch means including an electromagnetic clutch connected to said servomotor, said clutch comprising first and second discs and mounting means therefor, said first disc, nonrotatably secured to said servomotor, being rotatably driven thereby in response to said signal; means for engaging and disengaging said first and second discs; a thread wheel being nonrotatably secured to said second disc for rotation therewith when said clutch is engaged; an endless thread loop wound around said thread wheel; mounted guide rollers for supporting and tensioning a portion of said endless thread loop; a recording pen being mounted on said portion for movement therewith; a recording sheet and mounting means therefor for supporting said sheet in contact with said pen; means for translating said recording sheet in incremental steps in a first direction during the period when said clutch is disengaged, said recording pen on said loop portion being translated in a second direction perpendicular to said first direction a distance proportional to the amplitude of said signal when said clutch is engaged; and programming means and actuating means therefor being actuated after each manual placement of said surface contacting elements, said programming means including cams and microswitches for actuating said detector, said clutch engaging and disengaging means, and said recording sheet translating means to record said distance on said sheet in said second direction preceding each incremental step of the recording sheet and to record said incremental steps on said sheet in said first direction, the length of each step being proportional to the spacing of said surface contacting elements.

2. A device for measuring inclination as set forth in claim 1 wherein said detector means includes an electric level enclosing therein a pendulum for actuation thereof, an exciting coil connected to an external current supply source and series connected differential coils, the electrical coupling of said coils being a function of the position of said pendulum, said detector means further including first and second resistors connected in series with each other and in parallel with said differential coil to form a bridge, said bridge being connected through an amplifier to said servomotor and supplying an unbalanced voltage proportional to the inclination measured to control the rotational driving of said servomotor.

References Cited
UNITED STATES PATENTS

| | | | |
|---|---|---|---|
| 3,125,400 | 3/1964 | Moyano | 346—34 |
| 3,129,997 | 4/1964 | Melton | 346—33 |
| 3,394,583 | 7/1968 | Foley | 226—9 |
| 2,598,355 | 5/1952 | Cloud (1952) | 33—220(.5) |
| 2,647,323 | 8/1953 | Johnson | 33—215(.1) |
| 2,659,985 | 11/1953 | Cloud | 33—220(.6) |
| 3,286,357 | 11/1966 | Grumman | 33—215 |

LEONARD FORMAN, Primary Examiner

D. A. DEARING, Assistant Examiner

U.S. Cl. X.R.

33—215; 346—115